G. W. ELDRIDGE.
VEHICLE HUB AND BOX.

No. 189,439.　　　　　　　　　　Patented April 10, 1877.

WITNESSES
H. Aubrey Toulmin.
F. L. Ourand

INVENTOR
George W. Eldridge
Alexander & Mason
ATTORNEYS.

UNITED STATES PATENT OFFICE.

GEORGE W. ELDRIDGE, OF CHATHAM, ASSIGNOR OF ONE-HALF HIS RIGHT TO JOSEPH RAYMOND, OF HARWICK, MASSACHUSETTS.

IMPROVEMENT IN VEHICLE HUBS AND BOXES.

Specification forming part of Letters Patent No. 189,439, dated April 10, 1877; application filed January 20, 1877.

*To all whom it may concern:*

Be it known that I, GEORGE W. ELDRIDGE, of Chatham, in the county of Barnstable, and in the State of Massachusetts, have invented certain new and useful Improvements in Wheel Hubs and Boxes; and do hereby declare that the following is a full, clear, and exact description thereof, reference being had to the accompanying drawings, and to the letters of reference marked thereon, making a part of this specification.

The nature of my invention consists in the mode of securing the axle to the boxes of hubs, and the mode of securing the hub upon the boxes of wheeled vehicles, as will be hereinafter described.

In order to enable those skilled in the art to make and use my invention, I will now proceed to describe its construction and operation.

Figure 1:
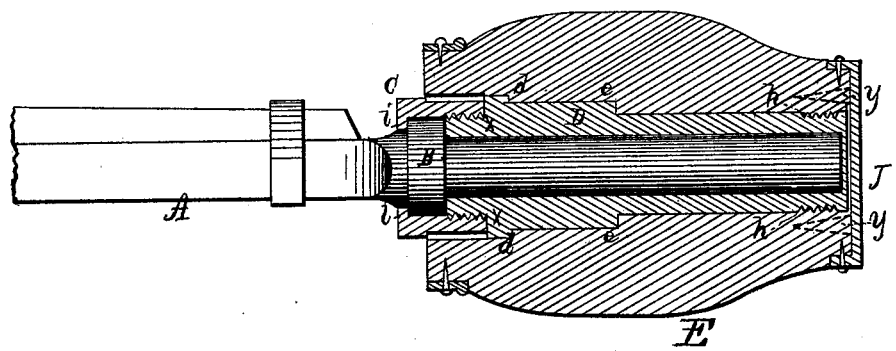
Figure 2:
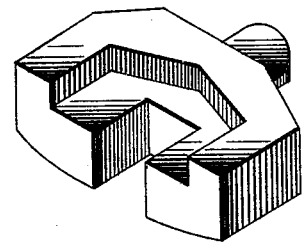
Figure 2:
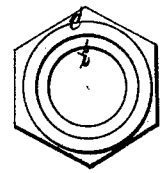

In the accompanying drawings, making part of this specification, Figure 1 represents a longitudinal section of the hub and box, with a simple side view of the axle. Fig. 2 represents a perspective of a wrench which goes with the hub and axle.

In the figures, A represents the axle of a vehicle, having a collar, B, at its inner bearing, as seen. This axle enters the box D of a hub, and is confined there by means of a nut, c, as will be described. The box D is provided at its inner end with a screw-thread, x, then with a shoulder, d, then with the usual rib or flange e, which sinks into a groove in the hub, and at its outer end with a series of grooves, as seen at h h. The box is fastened to the hub at its outer end by means of wedges y y, which are driven into the hub, so that the wood of the hub will enter the grooves at h h upon the box, and thus secure the two together. The outer end of the box is closed, so that no grease can escape from it. The outer end of the axle passes up to, and fits snugly against, the closed end of the box.

A cap, J, closes both the outer end of hub and the box.

C represents the hollow flanged nut which secures the axle to the box.

This nut passes over the collar B, but has a flange, i, which catches against the inner side of the collar. It has a screw-thread cut within its outer end, which engages with a similar thread, x x, upon the inner end of the box.

When this nut is screwed up so that it will catch fully upon the thread of the box, the shoulder i fits snugly against the outside of shoulder B.

The hub E can revolve readily around the axle, and the box D will be held securely to said axle by means of the screw-nut C.

Having thus fully described my invention, what I claim as new, and desire to secure by Letters Patent, is—

1. The combination of the box D, having closed end and annular grooves h, with the wooden hub E, connected to the box by the wedges y y, whereby the outer end of the box is secured to the hub without the use of an exterior nut and cap, J, substantially as set forth.

2. The axle-box D, having closed outer end and provided with shoulder d, grooves h, and screw-threads x x, the nut C, with flange i, the axle A, with collar B, and the wooden hub E, with cap J, all constructed substantially as set forth.

In testimony that I claim the foregoing I have hereunto set my hand this 1st day of January, 1877.

GEORGE W. ELDRIDGE.

Witnesses:
J. M. MASON,
DANFORTH S. STEEL.